(12) United States Patent
Sethi et al.

(10) Patent No.: US 11,922,180 B2
(45) Date of Patent: Mar. 5, 2024

(54) SYSTEM AND METHOD FOR AN OPTIMAL TIME SLOT DETERMINATION FOR AN APPLICATION UPGRADE IN A CUSTOMER ENVIRONMENT

(71) Applicant: EMC IP Holding Company LLC, Hopkinton, MA (US)

(72) Inventors: Parminder Singh Sethi, Punjab (IN); Lakshmi Nalam, Puram (IN); Vasanth Ds, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 17/386,389

(22) Filed: Jul. 27, 2021

(65) Prior Publication Data
US 2022/0398086 A1    Dec. 15, 2022

(30) Foreign Application Priority Data

Jun. 10, 2021   (IN) .............................. 202141025959

(51) Int. Cl.
G06F 8/65 (2018.01)
G06F 8/71 (2018.01)
G06F 9/445 (2018.01)
G06F 9/455 (2018.01)
G06F 9/48 (2006.01)
(Continued)

(52) U.S. Cl.
CPC ............ *G06F 9/44505* (2013.01); *G06F 8/65* (2013.01); *G06F 8/71* (2013.01); *G06F 9/45504* (2013.01); *G06F 9/45508* (2013.01); *G06F 9/4881* (2013.01); *G06F 11/3006* (2013.01); *G06F 11/301* (2013.01); *G06F 3/04847* (2013.01); *G06F 9/45558* (2013.01); *G06F 2009/4557* (2013.01); *G06F 2009/45579* (2013.01);
(Continued)

(58) Field of Classification Search
CPC ....................................................... G06F 8/65
See application file for complete search history.

(56) References Cited

U.S. PATENT DOCUMENTS 7,590,981 B2    9/2009  Gupta et al.
8,078,448 B1    12/2011 Wohlberg et al.
(Continued)

OTHER PUBLICATIONS

Fornadel et al., Estimation of Legacy Application Upgrade Time using Evolutionary Approach, 14th IEEE International Symposium on Computational Intelligence and Informatics, Nov. 2013, pp. 493-498, 6 pages.

*Primary Examiner* — Jae U Jeon
(74) *Attorney, Agent, or Firm* — Chamberlain, Hrdlicka, White, Williams & Aughtry; Aly Z. Dossa

(57) ABSTRACT

A method for managing a client environment includes obtaining, by a client device upgrade manager, an upgrade estimation for a client device executing in the client environment, wherein the upgrade estimation corresponds to an application upgrade for an application, in response to the upgrade estimation: performing an optimal time slot analysis for the client device to identify a set of optimal time slots, presenting the set of optimal time slots to the client device, obtaining, by the client device, a requested time slot for the application, and in response to the requested time slot, initiating an installation of an application upgrade of the application.

11 Claims, 10 Drawing Sheets

(51) Int. Cl.
*G06F 11/30* (2006.01)
*G06F 3/04847* (2022.01)

(52) U.S. Cl.
CPC .............. *G06F 2009/45591* (2013.01); *G06F 2201/815* (2013.01)

(56) References Cited

U.S. PATENT DOCUMENTS

| | | |
|---|---|---|
| 9,086,941 B1* | 7/2015 | Siegel .................... H04L 67/55 |
| 2008/0148268 A1* | 6/2008 | Hirouchi ............... G06F 9/4843 |
| | | 718/103 |
| 2011/0113224 A1 | 5/2011 | Isshiki et al. |
| 2015/0278219 A1 | 10/2015 | Phipps |
| 2016/0162280 A1 | 6/2016 | Murayama et al. |
| 2017/0322826 A1* | 11/2017 | Furuhashi ........... G06F 11/3006 |
| 2018/0113728 A1* | 4/2018 | Musani ................. G06F 11/362 |
| 2018/0152341 A1 | 5/2018 | Maeda et al. |
| 2020/0104113 A1 | 4/2020 | Grill et al. |
| 2020/0156243 A1 | 5/2020 | Ghare et al. |
| 2021/0034350 A1 | 2/2021 | Chen et al. |
| 2021/0048996 A1 | 2/2021 | Marzorati et al. |
| 2022/0215004 A1* | 7/2022 | Jakubovitz .......... G06F 11/3696 |
| 2022/0350588 A1* | 11/2022 | Liao ....................... G06N 20/00 |

\* cited by examiner

SYSTEM AND METHOD FOR AN OPTIMAL TIME SLOT DETERMINATION FOR AN APPLICATION UPGRADE IN A CUSTOMER ENVIRONMENT

BACKGROUND

Computing devices in a system may include any number of internal components such as processors, memory, and persistent storage. The computing devices may execute applications (e.g., software). Each application may be upgraded to newer versions. The time taken to upgrade the application to the newer version may interrupt the operation of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing applications. Specifically, embodiments of the invention include a method and system for estimating a time taken to perform an application upgrade on a client device by performing a similar application upgrade on a device emulating the client device. The results of the application upgrade performed on the emulated device are monitored and provided to a client device upgrade manager.

The client device upgrade manager may perform a reboot-upgrade dependency analysis to determine an optimal upgrade schedule in which the application upgrade may be performed. The reboot-upgrade dependency analysis may identify the number of application upgrades to be performed on a client device, the number of reboots required to perform all application upgrades, and the order in which the application upgrades would need to be performed. Based on this information, the reboots and applications may be performed in parallel such that the minimum amount of time is required. The optimal upgrade schedule may be provided to the client device with identified optimal time slots in which the application upgrade may be performed. Based on a selection of a time slot by a user of the client device, the application upgrade may be performed.

Figure 1:
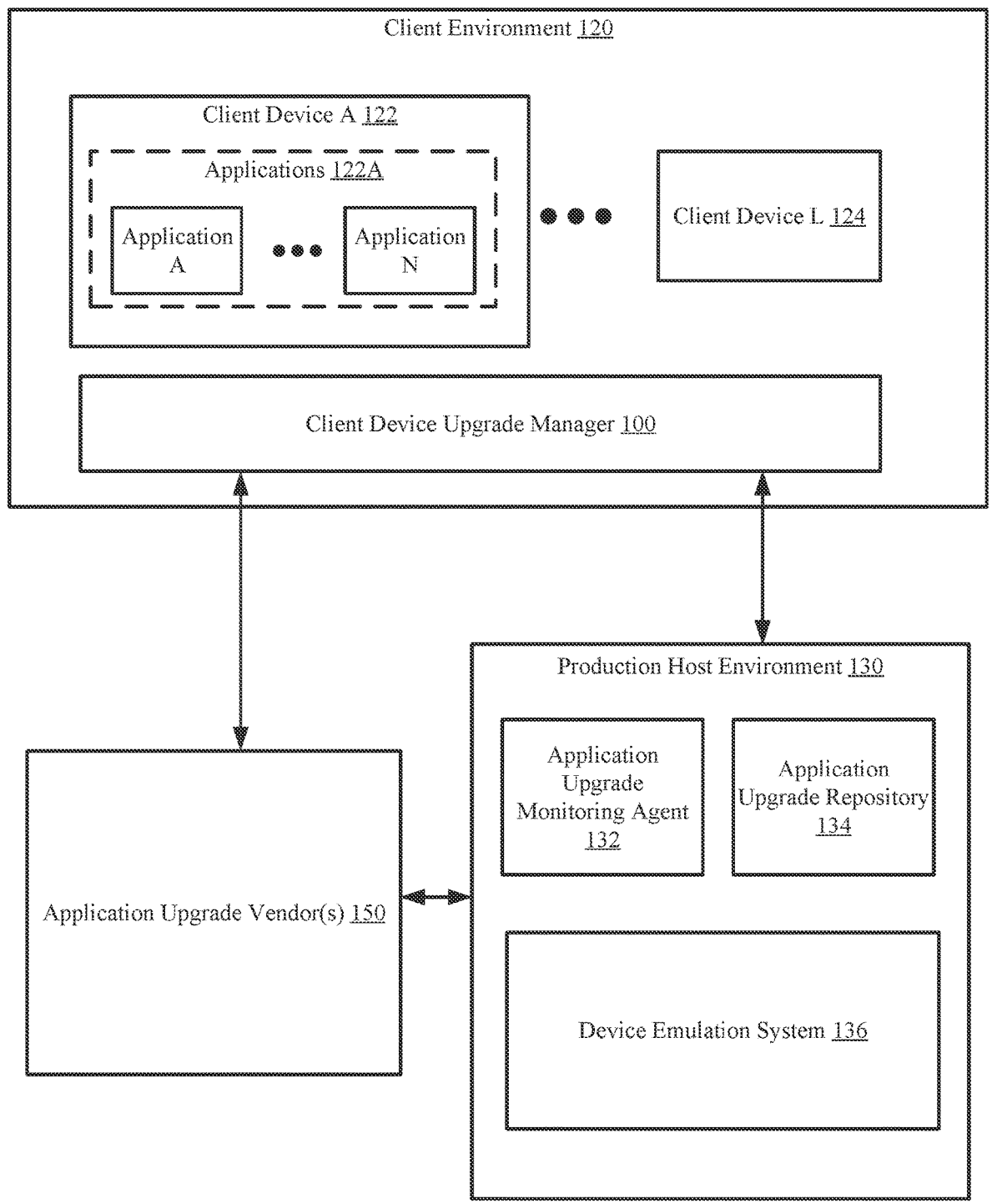
FIG. 1 shows a diagram of a system in accordance with one or more embodiments of the invention.

FIG. 1 shows an example system in accordance with one or more embodiments of the invention. The system includes a client environment (120), one or more application upgrade vendors (150), and a production host environment (130). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the client environment includes client devices (122, 124) and a client device upgrade manager (100). Each client device (122, 124) may include applications (122A). The applications (122A) may be logical entities executed using computing resources (not shown) of the client devices (122, 124). Each of the applications may be performing similar or different processes. In one or more embodiments of the invention, the applications (122A) provide services to users, e.g., clients (not shown). For example, the applications (122A) may host components. The components may be, for example, instances of databases, email servers, and/or other components. The applications (122A) may host other types of components without departing from the invention. An application (122) may be executed on one or more client devices (e.g., 122, 124) as instances of the application.

The applications (122A) may be upgraded based on newer versions available for installation. The installation of application upgrades may be performed and/or otherwise initiated by the client device upgrade manager (100). The client device upgrade manager (100) may obtain upgrade estimations that specify the required estimated time that an application upgrade may take. The client device upgrade manager (100) may provide the upgrade estimated time and optimal time slots in which the application upgrade may be performed. The client device upgrade manager (100) may perform the method of FIG. 3D to perform the application upgrade.

In one or more embodiments of the invention, the application upgrade may further include functionality for monitoring device configuration information of the client devices (122, 124) such as operating system information, number of applications, current versions of such applications, processing power, memory capability, storage, etc. The device configuration information may be provided to the production host environment (130).

In one or more of embodiments of the invention, the applications (122A) are implemented as computer instructions, e.g., computer code, stored on a persistent storage that when executed by a processor(s) of a computing device cause the computing device to provide the functionality of the applications (122A) described throughout this application.

Figure 5:
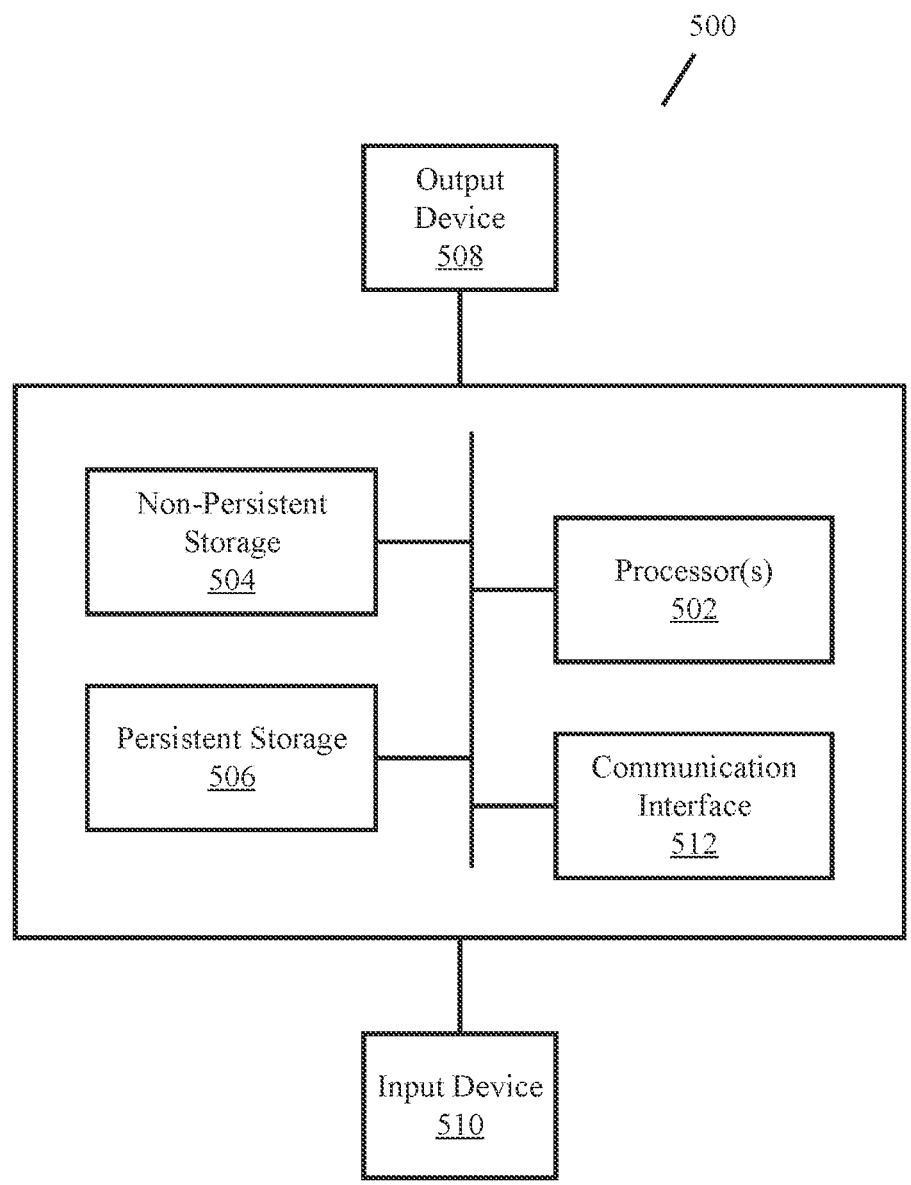
FIG. 5 shows a diagram of a computing device in accordance with one or more embodiments of the invention.

In one or more embodiments of the invention, the client device upgrade manager (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application and/or all, or a portion thereof, of the methods illustrated in FIGS. 3A-3D.

In one or more embodiments of the invention, the client device upgrade manager (100) is implemented as a logical device. The logical device may utilize the computing resources of any number of computing devices and thereby provide the functionality of the client device upgrade manager (100) described throughout this application and/or all, or a portion thereof, of the methods illustrated in FIGS. 3A-3D.

In one or more embodiments of the invention, the production host environment (130) estimates the upgrade times and required reboots to perform the application upgrades. The production host environment (130) may include an application upgrade monitoring agent (132), an application upgrade repository (134), and a device emulation system (136). The production host environment (130) may include additional, fewer, and/or different components without departing from the invention.

In one or more embodiments of the invention, the application upgrade monitoring agent (132) monitors the application upgrade repository (134) to identify when a new version of an application upgrade is stored (e.g., by an application upgrade vendor (150)). The application upgrade monitoring agent (132), in response to a new application upgrade, performs the method of FIG. 3A to initiate an estimation of performing the application upgrade on one or more of the client devices (122, 124) in the client environment (120). The upgrade estimation(s) may be provided to the client device upgrade manager (100).

In one or more embodiments of the invention, the application upgrade monitoring agent (132) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application upgrade monitoring agent (132) described throughout this application and/or all, or a portion thereof, of the methods illustrated in FIGS. 3A-3D.

In one or more embodiments of the invention, the application upgrade monitoring agent (132) is implemented as a logical device. The logical device may utilize the computing resources of any number of computing devices and thereby provide the functionality of the application upgrade monitoring agent (132) described throughout this application and/or all, or a portion thereof, of the methods illustrated in FIGS. 3A-3D.

In one or more embodiments of the invention, the application upgrade repository (134) stores versions of application upgrades. The application upgrade repository (134) may be updated by the application upgrade vendors (150) based on new versions of application upgrades being available. The application upgrade repository (134) may further include catalog files that specify the requirements of a client device in order for the application upgrade to be installed. The requirements may include, for example, a compatible device model, a minimum application version for the application upgrade to be installed, a compatible operating system (and corresponding version of such operating system), and an update sequence.

In one or more embodiments of the invention, the device emulation system (136) is a system of device emulation containers that may be configured to emulate a client device (122, 124). The emulation of the client devices may be used for performing the application upgrades on the emulated devices and measuring upgrade metrics such as time taken, number of reboots required, etc. For additional details regarding the device emulation system (136), see, e.g., FIG. 2.

In one or more embodiments of the invention, the device emulation system (136) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application and/or all, or a portion thereof, of the methods illustrated in FIGS. 3A-3D.

In one or more embodiments of the invention, the device emulation system (136) is implemented as a logical device. The logical device may utilize the computing resources of any number of computing devices and thereby provide the functionality of the device emulation system (136) described throughout this application and/or all, or a portion thereof, of the methods illustrated in FIGS. 3A-3D.

In one or more embodiments of the invention, the production host environment (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
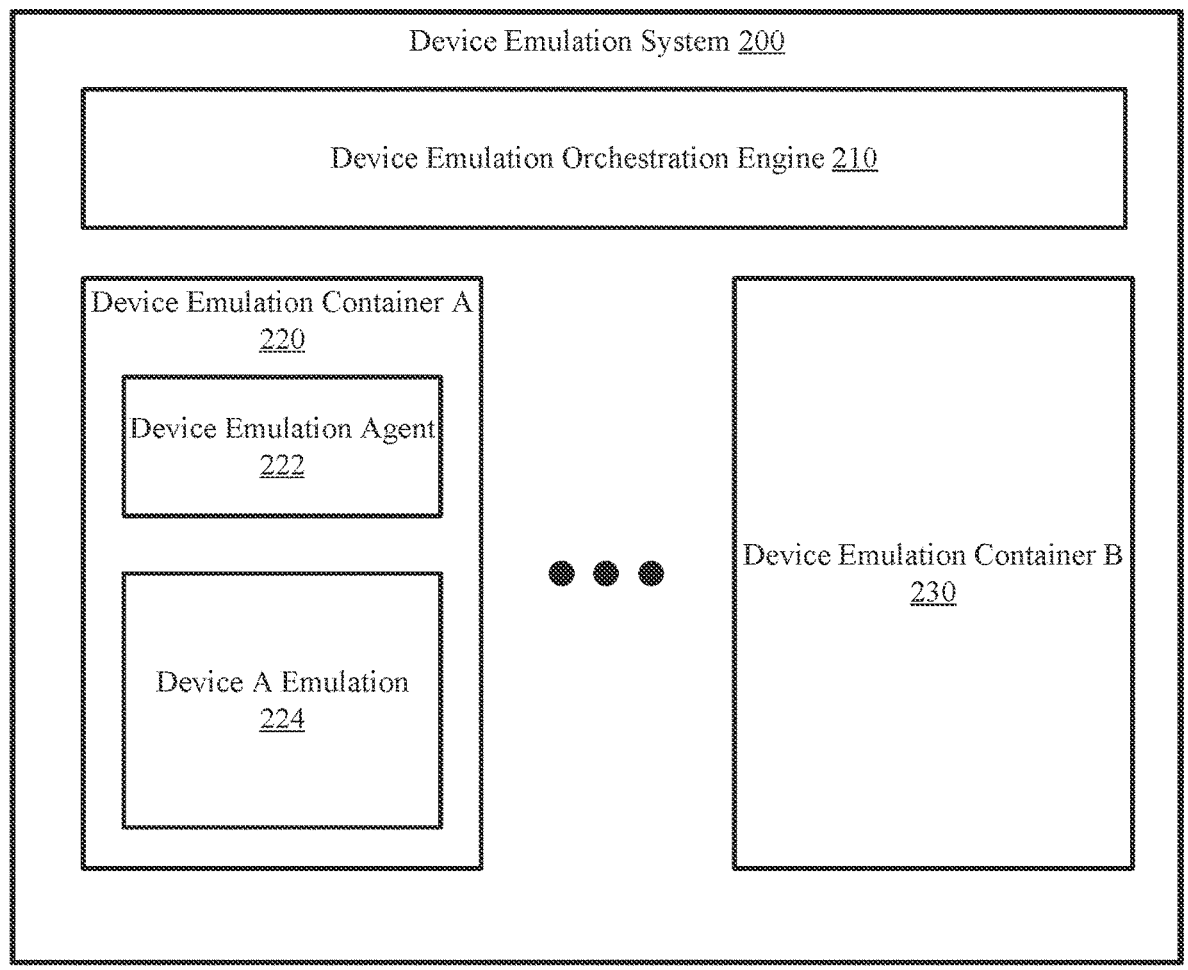
FIG. 2 shows a diagram of a device emulation system in accordance with one or more embodiments of the invention.

FIG. 2 shows a diagram of a device emulation system without departing from the invention. The device emulation system (200) may be an embodiment of the device emulation system (136, FIG. 1) discussed above. As discussed above, the device emulation system (200) emulates client devices. The device emulation system (200) may include a device emulation orchestration engine (210) and one or more device emulation containers (220, 230). The device emulation system (200) may include additional, fewer, and/or different components without departing from the invention.

In one or more embodiments of the invention, the device emulation orchestration engine (210) orchestrates the generation of the device emulation containers (220, 230). The device emulation orchestration engine (210) may obtain requests to emulate the application upgrade on an emulated device and to provide obtained upgrade estimations to the production host environment discussed above. The device emulation orchestration engine (210) may initiate the emulation of the devices and initiate the upgrades in accordance with FIG. 3B.

In one or more embodiments of the invention, the device emulation orchestration engine (210) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

In one or more embodiments of the invention, the device emulation orchestration engine (210) is implemented as a logical device. The logical device may utilize the computing resources of any number of computing devices and thereby provide the functionality of the device emulation orchestration engine (210) described throughout this application.

In one or more embodiments of the invention, the device emulation containers (220) include a device emulation agent (222) that monitors the upgrades performed on an emulated device (224) of the device emulation container (220) to measure the time taken to perform each application upgrade and to track the number of reboots performed during the upgrade.

FIGS. 3A-3D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3D may be performed in parallel with any other steps shown in FIGS. 3A-3D without departing from the scope of the invention.

Figure 3A:
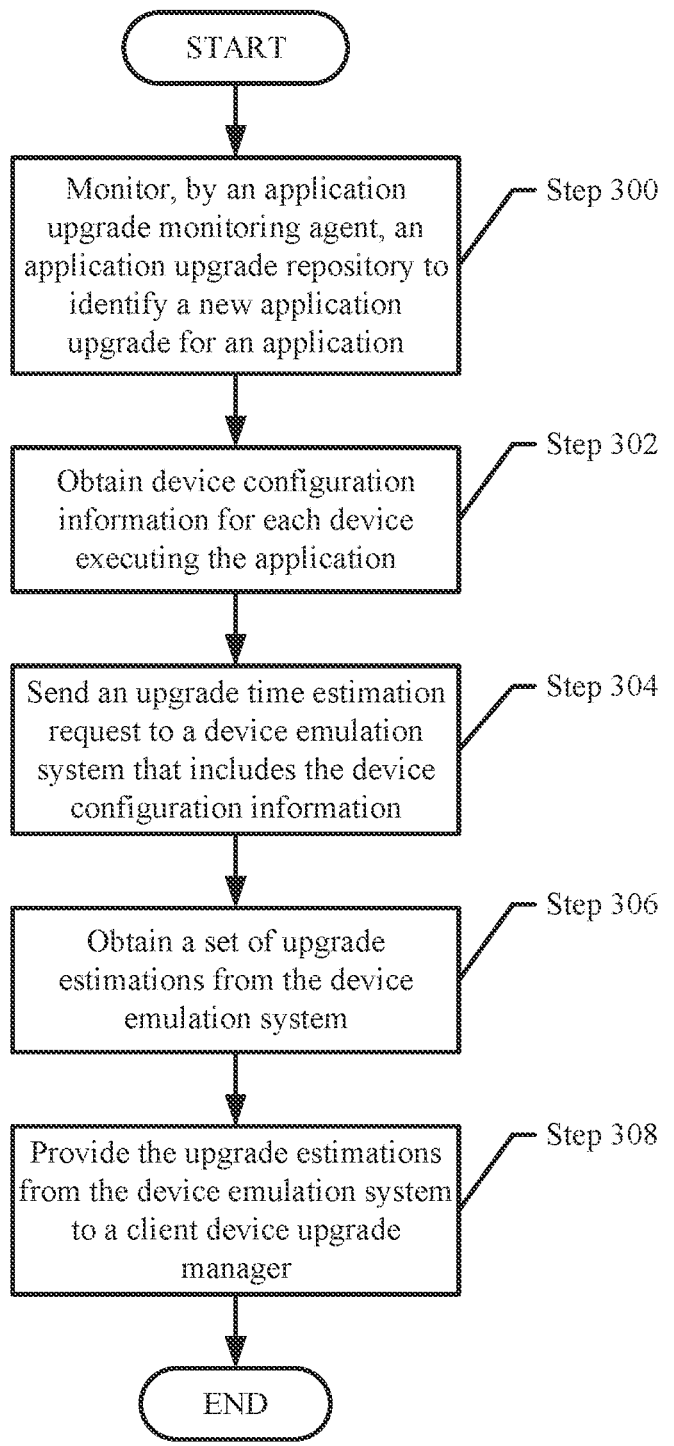
FIG. 3A shows a flowchart for managing an application upgrade based on a new application upgrade in accordance with one or more embodiments of the invention.

FIG. 3A shows a flowchart for managing an application upgrade based on a new application upgrade in accordance with one or more embodiments of the invention. The method shown in FIG. 3A may be performed by, for example, an application upgrade monitoring agent (e.g., 132, FIG. 1). Other components of the system illustrated in FIG. 1 may perform the method of FIG. 3A without departing from the invention.

Turning to FIG. 3A, in step 300, an application upgrade repository is monitored to identify a new application upgrade for an application. In one or more embodiments of the invention, the application upgrade repository is monitored to determine whether a change in the application upgrade repository has occurred. The change may be, for example, a new application upgrade has been stored in the application upgrade repository. The new application upgrade may be stored by an application vendor that generates application upgrades for an application.

In step 302, device configuration information is obtained for each device executing the application. In one or more embodiments of the invention, the device configuration information may be obtained from a client device upgrade manager. The device configuration information may be obtained prior to identifying the new application upgrade.

In one or more embodiments of the invention, the device configuration information specifies the configuration of a set of client devices that execute the application. The configuration may be associated with, for example, a current version of the operating system (OS) of the client device, the number of processors (e.g., central processing units (CPUs)), the amount of memory available for the client device, a number of applications executing on the client device, and the amount of available persistent storage of the client device. Other configurations may be specified in the device configuration information without departing from the invention.

In step 304, an upgrade time estimation request is sent to a device emulation system that includes the device configuration information. In one or more embodiments of the invention, the upgrade time estimation request specifies generating an upgrade estimation corresponding to performing the upgrade on each of a set of client devices on which the upgrade may be performed. The device configuration information may be provided with the upgrade time estimation request.

Figure 3B:
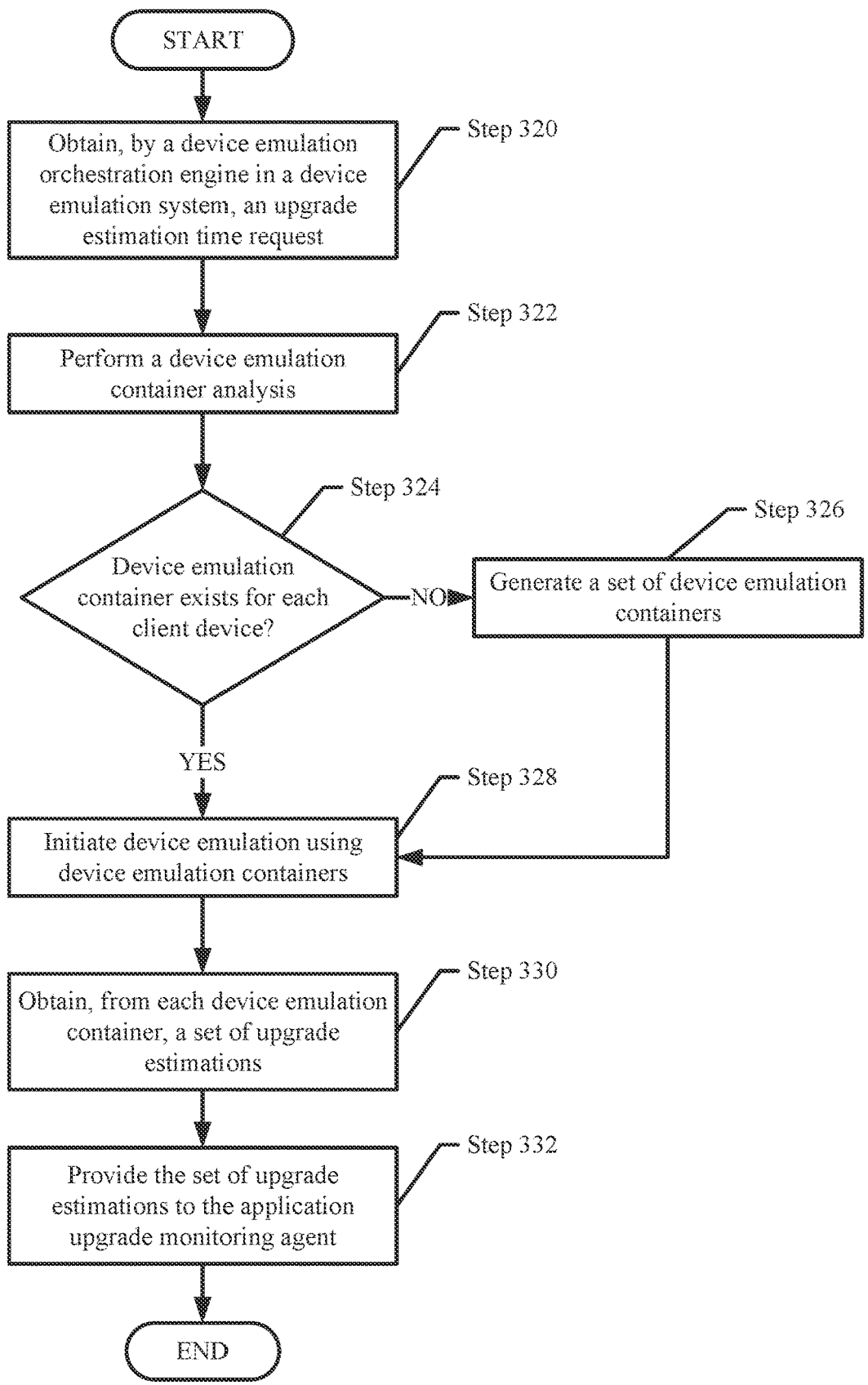
FIG. 3B shows a flowchart for performing a device emulation to obtain upgrade estimations in accordance with one or more embodiments of the invention.
Figure 3C:
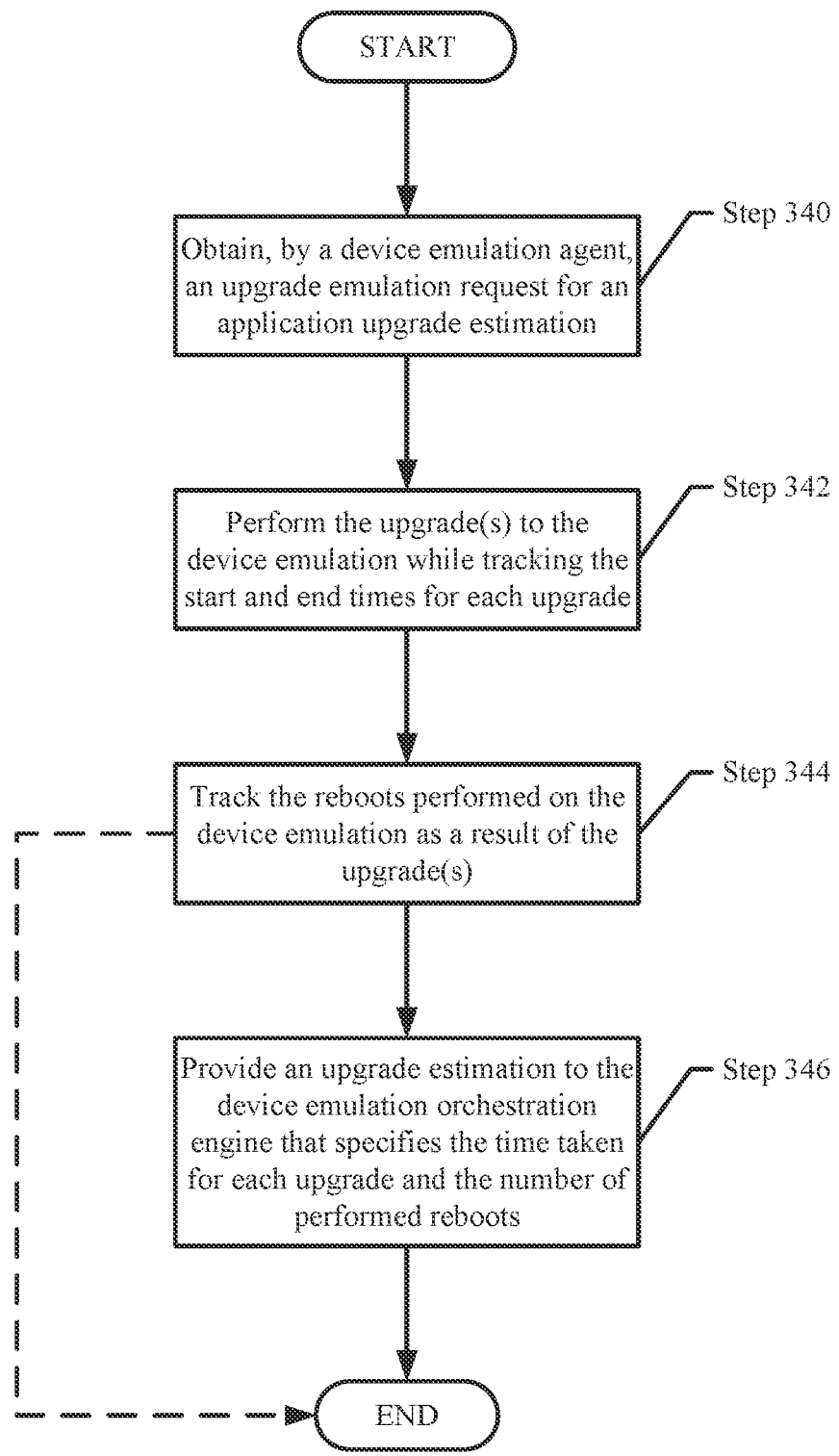
FIG. 3C shows a flowchart for tracking upgrade statistics in accordance with one or more embodiments of the invention.

In one or more embodiments of the invention, the device emulation system obtaining the upgrade time estimation request may perform the methods of FIG. 3B-3C to service the upgrade time estimation request. The upgrade time estimation request may be serviced via any other method without departing from the invention.

In step 306, a set of upgrade estimations is obtained from the device emulation system. In one or more embodiments of the invention, the set of upgrade estimations specifies a period of time estimated to take for an application upgrade to be installed in a client device. The set of upgrade estimations, collectively, may include the upgrade estimations for each client device in the set of client devices for which the upgrade is to be performed.

In step 308, the set of upgrade estimations is provided to a client device upgrade manager.

FIG. 3B shows a flowchart for performing a device emulation to obtain upgrade estimations in accordance with one or more embodiments of the invention. The method shown in FIG. 3B may be performed by, for example, a device emulation orchestration engine (e.g., 210, FIG. 2). Other components of the system illustrated in FIG. 1 or FIG. 2 may perform the method of FIG. 3B without departing from the invention.

In step 320, an upgrade estimation time request is obtained. In one or more embodiments of the invention, the upgrade estimation time request is obtained from the application upgrade monitoring agent discussed above. As discussed above, the upgrade estimation time request may specify generating an upgrade estimation corresponding to performing the upgrade on each of a set of client devices on which the upgrade may be performed. The upgrade estimation time request may include device configuration information.

In step 322, a device emulation container analysis is performed to determine a set of client devices that require an application upgrade. In one or more embodiments of the invention, the device emulation container analysis includes analyzing the obtained device configuration analysis to determine which client devices meet upgrade criteria. The upgrade criteria may include, for example, that a client device executes the application of the application upgrade, that the client device comprises the computing resources (e.g., storage, processing, etc.) to execute the application upgrade. Such criteria may be determined using catalog files (discussed in FIG. 1) that specify the requirements for installing the application upgrade.

In one or more embodiments of the invention, the device emulation container analysis further includes an analysis of the available and existing device emulation containers to determine, using the device configuration information, whether a device emulation container exists for each client device. Such determination may be performed by searching, for each client device that meets the upgrade criteria, for a device emulation container that is configured to emulate a device with similar configurations as that of the client device.

In step 324, a determination is made about whether a device emulation container exists for each client device in the set of client device. If a device emulation container exists for each client device, the method proceeds to step 328; otherwise, the method proceeds to step 326.

In step 326, a set of device emulation containers is generated using device configuration information specified in the upgrade estimation time request. In one or more embodiments of the invention, each device emulation container associated with a client device is generated by applying a set of computing resources to generate the device emulation container, and populating the device emulation container with an emulated device that is configured to emulate a computing device in accordance with the device configuration information of the client device. Further, the generated device emulation containers may include device emulation agents that monitor and initiate the upgrade emulations discussed below.

In step 328, an upgrade emulation is initiated using device emulation containers. The device emulation containers may include the device emulation containers identified in step 322. Further, the device emulation containers may include any device emulation containers generated in step 326.

In one or more embodiments of the invention, the upgrade emulations are initiated by sending upgrade emulation requests to a device emulation agent executing on each device emulation container. The upgrade emulation request specifies applying the application upgrade to an emulated device of the corresponding client device, and monitoring the installation of the application upgrade to obtain upgrade statistics. The upgrade statistics (discussed in FIG. 3C) may be used to generate upgrade statistics. The upgrade emulation request may further include the application upgrade (e.g., obtained from the application upgrade repository) and/or any intermediate application upgrades required to complete the application upgrade on each client device. The installation of the application upgrade may refer to the installation of the intermediate application upgrades in addition to the application upgrade that was identified in FIG. 3A.

In one or more embodiments of the invention, the upgrade emulation may be performed by each device emulation container in accordance with FIG. 3C. The upgrade emulation may be performed via any other method without departing from the invention.

In step 330, a set of upgrade estimations is obtained from each device emulation container. In one or more embodiments of the invention, the set of upgrade estimations specifies a period of time estimated for the application upgrade to take to complete on a client device. The upgrade estimations may each specify a number of reboots to be performed for each installation of an application upgrade.

In step 332, the set of upgrade estimations is provided to the application upgrade monitoring agent.

FIG. 3C shows a flowchart for tracking upgrade statistics in accordance with one or more embodiments of the invention. The method shown in FIG. 3C may be performed by, for example, a device emulation agent (e.g., 222, FIG. 2). Other components of the system illustrated in FIG. 1 or FIG. 2 may perform the method of FIG. 3C without departing from the invention.

In step 340, an upgrade emulation request is obtained from a device emulation orchestration engine. In one or more embodiments of the invention, the upgrade emulation request is obtained in response to an upgrade emulation request being sent in step 328 of FIG. 3B.

In step 342, the upgrades are performed to the emulated device while tracking the start and end times for each application upgrade. In one or more embodiments of the invention, the upgrade performed on the emulated device may include installing any number of intermediate application upgrades. For example, the emulated device may include a first version of an application. The application upgrade may require the installing an intermediate version of the upgrade for the application upgrade to be completely installed on the emulated device. The start and end times of each application upgrade, and any intermediate upgrades, may be tracked in step 342.

In step 344, the reboots performed on the emulated device during the application upgrades are tracked. In one or more embodiments of the invention, the reboots are tracked by implementing a counter that tracks the number of reboots performed for the application upgrade. Further, the start and end times of the reboots may be tracked to be included in the total time taken to complete the application upgrade.

In one or more embodiments of the invention, the reboots may be a requirement for the application upgrades. For example, one or more reboots may be performed for each application upgrade and/or intermediate application upgrades. Such required reboots may be considered expected reboots.

In one or more embodiments of the invention, during the installation of the application upgrade, an unexpected reboot may occur. Such unexpected reboot is a reboot that is not required, or otherwise not specified in the application upgrade. For example, the unexpected reboot may occur in response to a lack of available emulated computing resource of the emulated device. In such embodiments in which an unexpected reboot occurs in the emulated device, the device emulation agent monitoring the reboot may end the attempt of the installation of the application upgrade. Following this, the device emulation agent may send a notification to the device emulation orchestration engine that specifies the unexpected reboot. The device emulation orchestration engine, in response to the notification, may initiate notification of the failed attempt of the application upgrade on the emulated device to the client device, and the method may end following step 348.

In step 346, an upgrade estimation is provided to the device emulation orchestration engine. In one or more embodiments of the invention, the upgrade estimation specifies the time taken for each upgrade and the number of performed reboots.

Figure 3D:
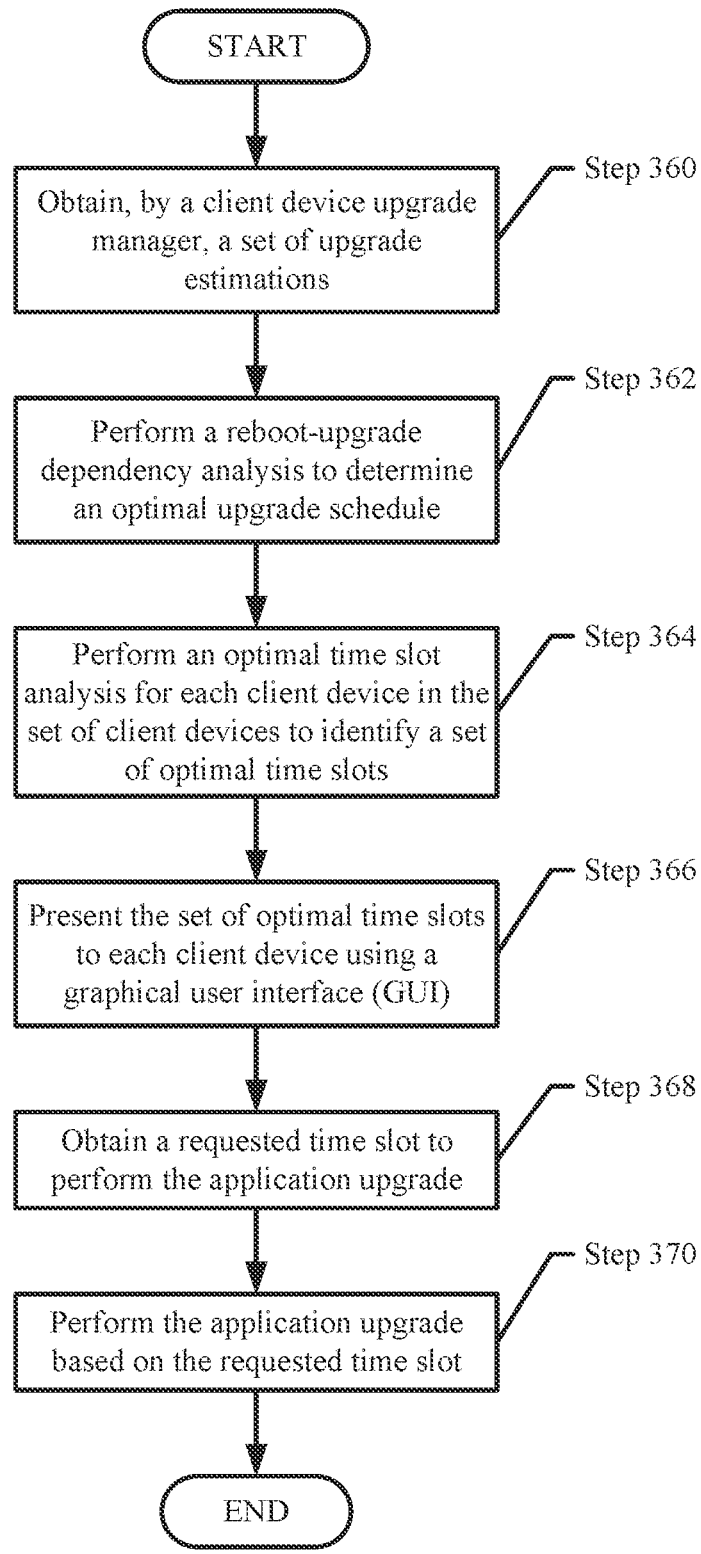
FIG. 3D shows a flowchart for performing an upgrade estimation and an application upgrade in accordance with one or more embodiments of the invention.

FIG. 3D shows a flowchart for performing an upgrade estimation and an application upgrade in accordance with one or more embodiments of the invention. The method shown in FIG. 3D may be performed by, for example, a client device upgrade manager (e.g., 100, FIG. 1). Other components of the system illustrated in FIG. 1 may perform the method of FIG. 3D without departing from the invention.

In step 360, a set of upgrade estimations is obtained. In one or more embodiments of the invention, the upgrade estimations are the upgrade estimations provided by the application upgrade monitoring agent in step 308 of FIG. 3A. The upgrade estimations may be generated in accordance with FIG. 3C discussed above.

In step 362, a reboot-upgrade dependency analysis is performed to determine an optimal upgrade schedule for each upgrade estimation. In one or more embodiments of the invention, the reboot-upgrade dependency analysis includes identifying, for each upgrade estimation, the number of reboots performed during the upgrade emulation, identifying the intermediate application upgrades performed, identifying the dependency of the intermediate application upgrades (e.g., whether a first intermediate application upgrade is required to be performed prior to a second intermediate application upgrade), and deriving the optimal upgrade schedule based on the identified reboots and dependencies.

In one or more embodiments of the invention, the reboot-dependency analysis derives the optimal upgrade schedule by identifying reboots that may be combined (e.g., performed concurrently) such that the total number of reboots are reduced.

For example, consider a scenario in which two application upgrades, independent of each other, may be performed on the client device. The first application upgrade may require one reboot, and the second application upgrade may require two reboots. In such example, the upgrade estimation may be based on three reboots being performed (e.g., each reboot being performed sequentially). The reboot-dependency analysis may result in the optimal upgrade schedule being based on performing the reboot of the first application upgrade with the first reboot of the second application upgrade. In this manner, the total number of reboots performed on the client device to install the two application upgrades may be reduced to two. Such combination of reboots for an installation of an application upgrade may be performed for all application upgrades of the installation on a client device. The reboot-dependency analysis may be performed for each upgrade estimation of the set of upgrade estimations.

In step 364, an optimal time slot analysis is performed for each client device in the set of client devices to identify a set of optimal time slots. In one or more embodiments of the invention, the optimal time slot analysis includes utilizing usage information of the client device to determine periods of time in the future that are predicted to be low usage. The usage information may specify, for example, a time series that specifies the usage of each computing resource of the client device over time. Such future periods of time may be predicted using, for example, a machine learning model that inputs the usage information and outputs a predicted set of periods of time in which the usage is predicted to be low. For example, the periods in time in which the usage is predicted to be low may relate to periods in time in which a user of the client device is not utilizing the client device and/or in which applications are not expected to be executing.

In one or more embodiments of the invention, the optimal time slot analysis further includes ranking the identified future periods of time based on expected preferences by the user of the client device. For example, the ranking may favor a period of time in which a user is likely to be sleeping. Such preferences may be determined by the client device upgrade manager or requested from the client device (e.g., prior to the methods of FIG. 3A-3D). The set of optimal time slots are identified for each client device.

In step 366, the set of optimal time slots are presented to each client device. In one or more embodiments of the invention, the optimal time slots are presented using a graphical user interface (GUI). The GUI may specify each of the set of optimal time slots based on their ranking as discussed above. For example, the higher-ranked optimal time slots may be presented first and/or at the top of the list. The GUI may be provided to the client device to enable a response from the client device in accordance with step 368 below.

In step 368, a requested time slot is obtained to perform the application upgrade for each client device. In one or more embodiments of the invention, the requested time slot may be obtained from the client device using the presented GUI discussed above.

For example, a first optimal time slot may be presented using the GUI. The client device may approve the first optimal time slot or request a new optimal time slot. A second optimal time slot may be presented, and the client device may select the second optimal time slot. When the second optimal time slot occurs, the client device may defer the application upgrade at the selected second optimal time slot. The GUI may provide the option to select a new optimal time slot or automatically initiate the application upgrade at a new optimal time slot. The result of this interaction may be referred to as the requested time slot.

In one or more embodiments of the invention, the requested time slot is obtained for each client device.

In step 370, the application upgrade is performed based on the requested time slot. In one or more embodiments of the invention, the application upgrade is performed in accordance with the installation of the application upgrade and each intermediate application upgrade. The reboots associated with each application upgrade and/or intermediate application upgrade may be combined in accordance with the reboot-dependency analysis discussed above.

Example

Figure 4A:
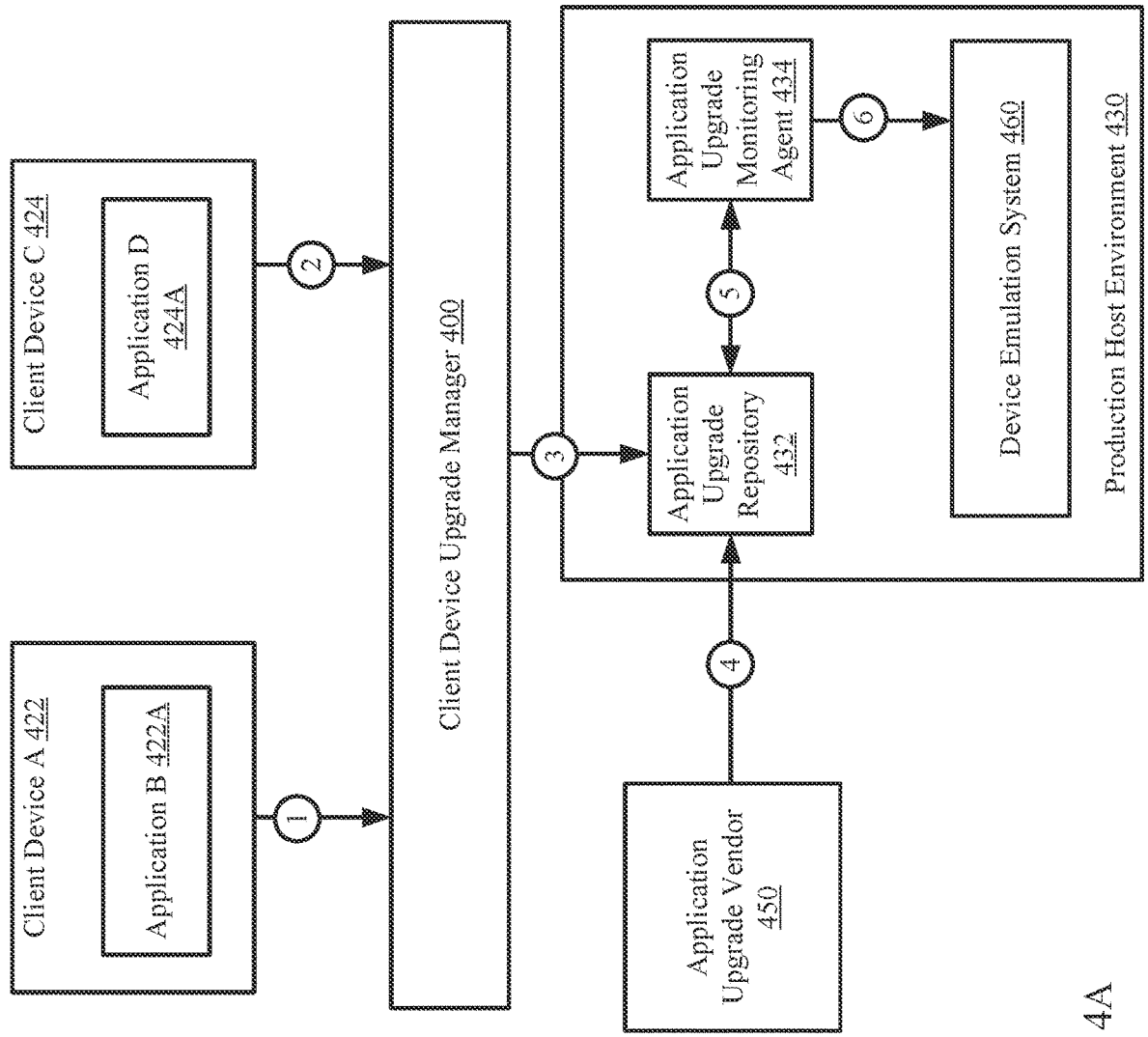
FIGS. 4A-4C show an example in accordance with one or more embodiments of the invention.
Figure 4B:
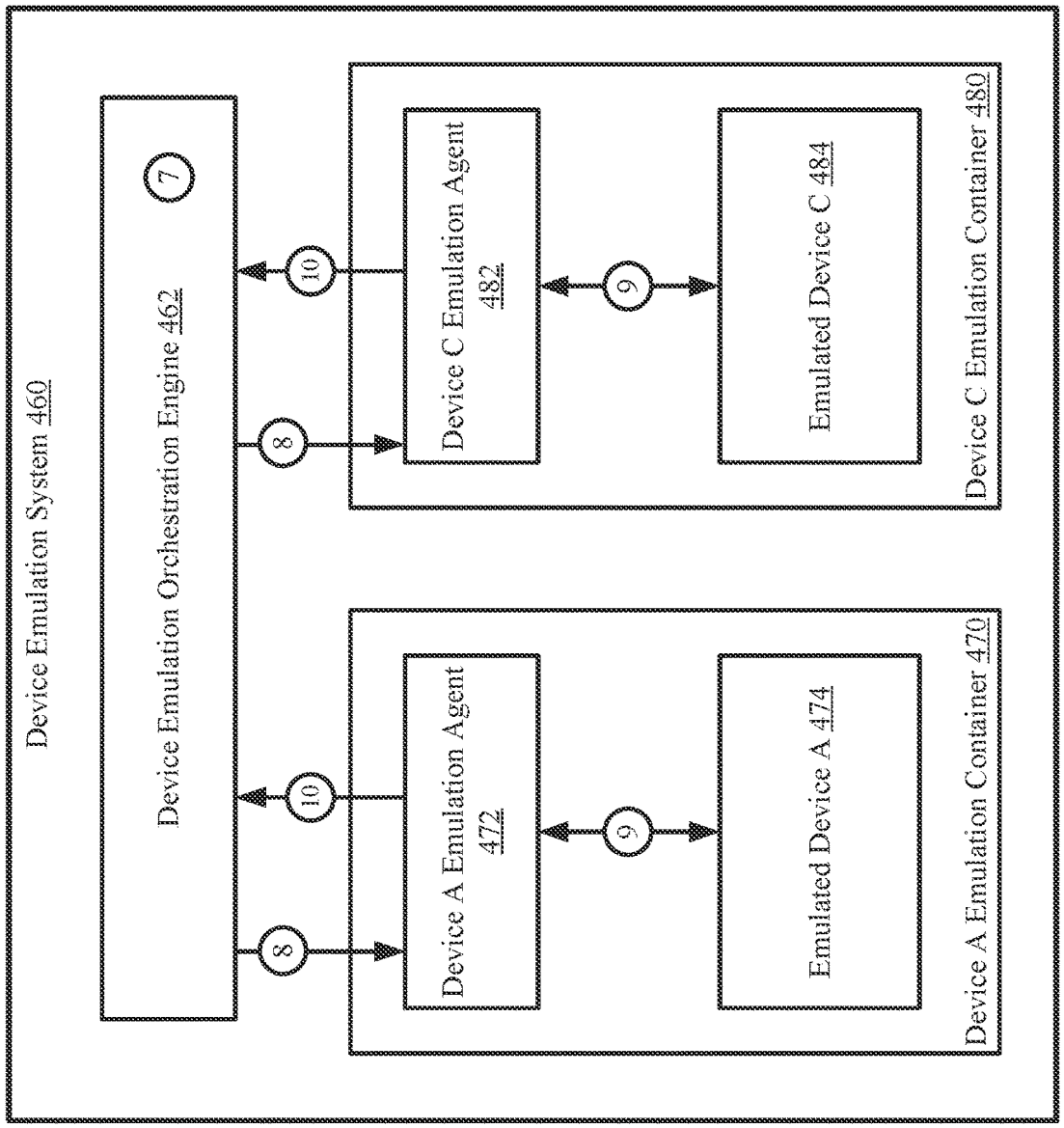
Figure 4C:
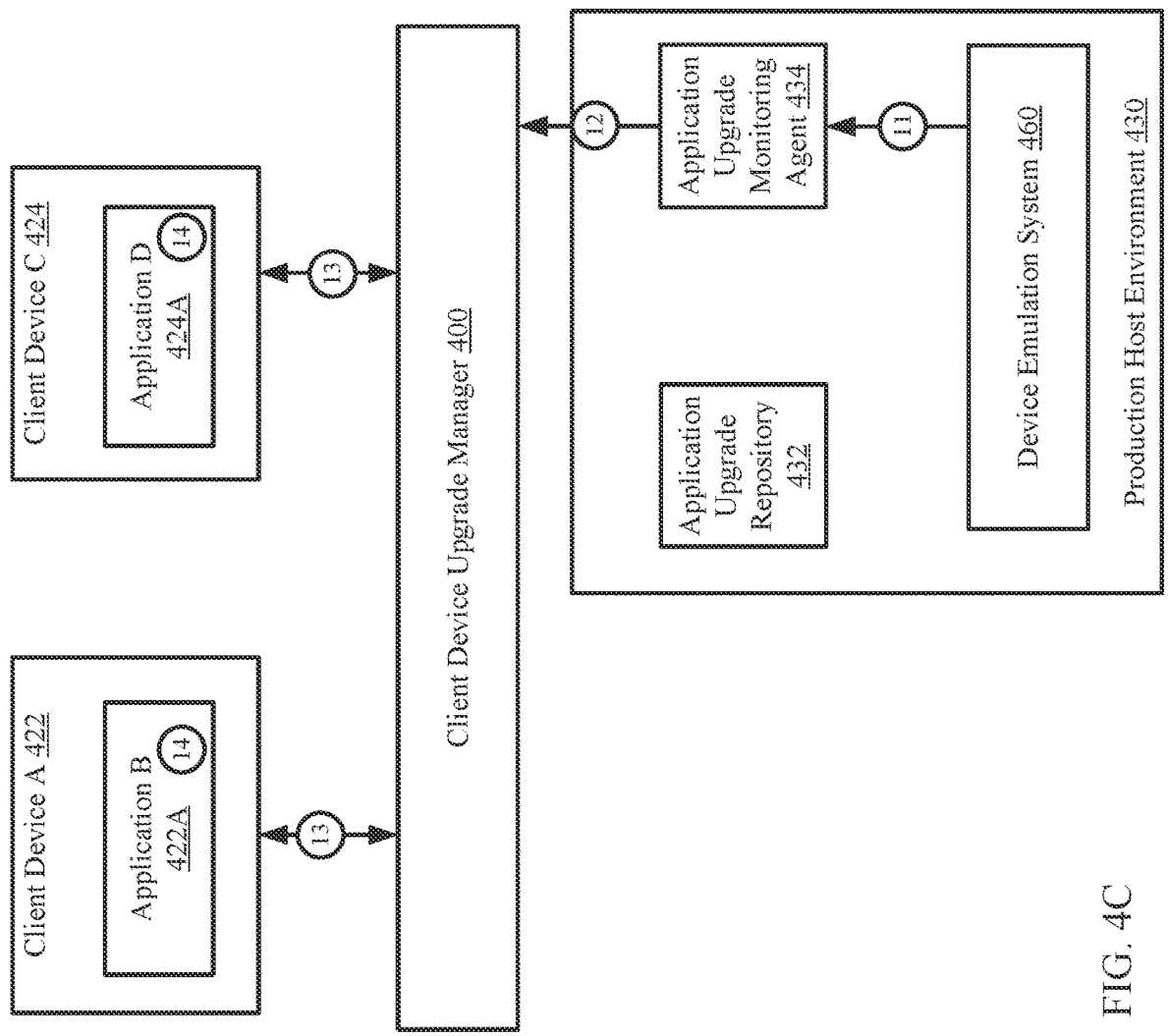

The following section describes an example. The example, illustrated in FIGS. 4A-4C, is not intended to limit the invention and is independent from any other examples discussed in this application. Turning to the example, consider a scenario in which an upgrade estimation time is performed for an application executing on two client devices.

Turning to the example, FIG. 4A shows a diagram of an example system. For the sake of brevity, not all components of the example system may be illustrated in FIG. 4A. The example system may include two client devices (client device A (422) and client device C (424)). Client device A (422) executes application B (422A), and client C (424) executes application D (424A). For clarity, each of the applications (422A, 424A) may be instances of the same application.

A client device upgrade manager (400) obtains device configuration information from each of client device A (422) [1] and client device C (424) [2]. The client device upgrade manager (400) stores configuration files each corresponding to the device configuration information of client devices A (422) and C (424) in an application upgrade repository (432) of a production host environment (430) [3].

At a later time, an application upgrade vendor (450) stores a new application upgrade in the application upgrade repository (432) [4]. The new application upgrade relates to the applications (422A, 424A) executing on client devices A (422) and C (424). An application upgrade monitoring agent (434) monitoring the application upgrade repository (432) identifies the new application upgrade [5]. The application upgrade monitoring agent (434), in response to identifying the new application upgrade, sends an upgrade estimation request to a device emulation system (460). The upgrade time estimation request includes the device configuration information of both client devices A (422) and C (424).

FIG. 4B shows a diagram of the device emulation system at a later point in time. For the sake of brevity, not all components of the example system may be illustrated in FIG. 4B. A device emulation orchestration engine (462) of the device emulation system (460) obtains the upgrade estimation time request and performs a device emulation container analysis as discussed in FIG. 3B to identify device emulation containers to perform the upgrade emulations [7]. The upgrade estimation time request includes the device configuration information of client devices A and C. The device emulation orchestration engine (462), in response to the device emulation container analysis, and using the device configuration information, identifies device A emulation container (470) that emulates device A in accordance with the device configuration information, and device C emulation container (480) that, similarly, emulates device C. Following the identification, the device emulation orchestration engine (462) sends upgrade emulation requests to a device emulation agent (472, 482) of each device emulation container (470, 480) [8].

Device A emulation agent (472), in response to the upgrade emulation request, performs the method of FIG. 3C to perform the upgrade emulation on an emulated device A (474) [9]. Similarly, device C emulation agent (472), in response to the upgrade emulation request, performs the method of FIG. 3C to perform the upgrade emulation on an emulated device C (484) [9]. The device emulation agents (472, 482) monitor their respective upgrade emulations to track the start times and end times of each application upgrade and the number of reboots performed for each application upgrade.

In this example, emulated device A (474) requires the installation of a prior version of the application upgrade before installing the application upgrade. One reboot is performed for each of the new application upgrade and the prior version of the application upgrade. Further, only the new application upgrade was installed in emulated device C (484), and only one total reboot is performed on emulated device C (484). Each of the aforementioned reboots are tracked by their respective device emulation agents (472, 482).

Following the completions of each of the respective upgrade emulations, the device emulation agents (472, 482) each generate an upgrade estimation. The set of upgrade estimations is provided to the device emulation orchestration agent (462) [10].

FIG. 4C shows a diagram of the example system at a later point in time. For the sake of brevity, not all components of the example system may be illustrated in FIG. 4C. Following the generation of the set of upgrade estimations, the device emulation system (460) provides the set of upgrade estimations to the application upgrade monitoring agent (434) [11]. The application upgrade monitoring agent (434) provides the set of upgrade estimations to the client device upgrade manager (400) [12].

In response to obtaining the set of upgrade estimations, the client device upgrade manager (400) performs the reboot-dependency analysis as discussed in FIG. 3D to determine an optimal upgrade schedule. Using the optimal upgrade schedule and using usage information of the client devices (422, 424) previously obtained, the client device upgrade manager (400) generates a set of optimal time slots for each client device (422, 424) that specifies a ranked list of optimal time slots that the application upgrade may be installed in the respected client devices (422, 424).

The client device upgrade manager (400), utilizing the generated set of optimal time slots, communicates with each client device (422, 424) independently to obtain a requested time slot for the respective application upgrades [13]. Specifically, the client device upgrade manager (400) presents a GUI to client device A (422) that specifies a ranking of one set of optimal time slots corresponding to client device A (422). The client device (422), using the GUI, selects a first time slot and provides the selection to the client device upgrade manager (400) as its requested time slot. Similarly, the client device upgrade manager (400) presents a second GUI to client device C (424) that specifies a ranking of a second set of optimal time slots corresponding to client device C (424). The client device (424), using the second GUI, selects a time slot and provides the selection to the client device upgrade manager (400) as its requested time slot.

After obtaining the requested time slots, the client device upgrade manager (400) initiates the installation of the application upgrades in the respective client devices (422, 424) [14]. Specifically, application B (422A) is upgraded at its respective requested time slot. Alternatively, an attempt to perform the upgrade on application D (424A) is initiated at its respective requested time slot. Client device C (424) sends a request to defer the application upgrade to a later time slot. The client device upgrade manager (400), in response to the request, defers the application upgrade to the later time slot. After such application upgrades are installed, application B (422A) and application D (424A) are upgraded.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (408), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the use of computing devices that emulate a customer environment of client devices. By performing application upgrades that are scheduled to be performed on the customer environment, embodiments of the invention reduce the interruption of the operation of the customer environment due to the requirement for reboots during the application upgrade process. Further, by performing the application upgrades on the emulated system, an estimation of time taken to perform the application upgrades on the customer environment is generated. The estimation of time may be used to determine an optimal period of time to initiate the application upgrade process. The determined period of time may be provided to the customer environment to allow the customer to select a preferred time.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a client environment, the method comprising:
   obtaining, by a client device upgrade manager, an upgrade estimation for a client device executing in the client environment,
      wherein the upgrade estimation corresponds to an application upgrade for an application,
      wherein the upgrade estimation is based on performing the application upgrade on a device emulation of the client device,
      wherein performing the application upgrade comprises performing a reboot-upgrade dependency analysis on the device emulation, and
      wherein the reboot-upgrade dependency analysis comprises:
         tracking a set of reboots performed during the application upgrade and identifying a dependency of a first intermediate application upgrade to the application upgrade; and
         identifying a portion of the set of reboots that may be performed concurrently to reduce a total number of the set of reboots for the application upgrade;
   in response to the upgrade estimation:
      performing an optimal time slot analysis for the client device to identify a set of optimal time slots;
      presenting the set of optimal time slots to the client device;
      obtaining, by the client device, a requested time slot for the application; and
      in response to the requested time slot, initiating an installation of an application upgrade of the application.

2. The method of claim 1, wherein presenting the set of optimal time slots comprises:
   generating a graphical user interface (GUI) that displays the set of optimal time slots, and displaying the GUI on the client device.

3. The method of claim 1, wherein performing the optimal time slot analysis comprises:
   determining, based on usage information of the client device, a low-usage schedule of the client device; and
   determining, based on the low-usage schedule and the upgrade estimation, the set of optimal time slots.

4. The method of claim 1,
   wherein the upgrade estimation is obtained from a production host environment,
   wherein the production host environment is operatively connected to the client environment.

5. A non-transitory computer readable medium comprising computer readable program code, which when executed by a computer processor enables the computer processor to perform a method for managing a client environment, the method comprising:
   obtaining, by a client device upgrade manager, an upgrade estimation for a client device executing in the client environment,
      wherein the upgrade estimation corresponds to an application upgrade for an application, wherein the upgrade estimation is based on performing the application upgrade on a device emulation of the client device, wherein performing the application upgrade comprises performing a reboot-upgrade dependency analysis on the device emulation, and wherein the reboot-upgrade dependency analysis comprises:

tracking a set of reboots performed during the application upgrade and identifying a dependency of a first intermediate application upgrade to the application upgrade; and identifying a portion of the set of reboots that may be performed concurrently to reduce a total number of the set of reboots for the application upgrade;

in response to the upgrade estimation:

performing an optimal time slot analysis for the client device to identify a set of optimal time slots;

presenting the set of optimal time slots to the client device;

obtaining, by the client device, a requested time slot for the application; and in response to the requested time slot, initiating an installation of an application upgrade of the application.

6. The non-transitory computer readable medium of claim 5, wherein presenting the set of optimal time slots comprises:

generating a graphical user interface (GUI) that displays the set of optimal time slots, and displaying the GUI on the client device.

7. The non-transitory computer readable medium of claim 5, wherein performing the optimal time slot analysis comprises:

determining, based on usage information of the client device, a low-usage schedule of the client device; and determining, based on the low-usage schedule and the upgrade estimation, the set of optimal time slots.

8. The non-transitory computer readable medium of claim 5, wherein the upgrade estimation is obtained from a production host environment, wherein the production host environment is operatively connected to the client environment.

9. A system comprising:

a client environment;

a processor; and memory comprising instructions, which when executed by the processor, perform a method comprising:

obtaining, by a client device upgrade manager, an upgrade estimation for a client device executing in the client environment, wherein the upgrade estimation corresponds to an application upgrade for an application, wherein the upgrade estimation is based on performing the application upgrade on a device emulation of the client device, wherein performing the application upgrade comprises performing a reboot-upgrade dependency analysis on the device emulation, and wherein the reboot-upgrade dependency analysis comprises:

tracking a set of reboots performed during the application upgrade and identifying a dependency of a first intermediate application upgrade to the application upgrade; and identifying a portion of the set of reboots that may be performed concurrently to reduce a total number of the set of reboots for the application upgrade;

in response to the upgrade estimation:

performing an optimal time slot analysis for the client device to identify a set of optimal time slots;

presenting the set of optimal time slots to the client device;

obtaining, by the client device, a requested time slot for the application; and in response to the requested time slot, initiating an installation of an application upgrade of the application.

10. The system of claim 9, wherein presenting the set of optimal time slots comprises:

generating a graphical user interface (GUI) that displays the set of optimal time slots, and displaying the GUI on the client device.

11. The system of claim 9, wherein performing the optimal time slot analysis comprises:

determining, based on usage information of the client device, a low-usage schedule of the client device; and determining, based on the low-usage schedule and the upgrade estimation, the set of optimal time slots.

\* \* \* \* \*